R. STAR.
APPARATUS FOR INDICATING THE SPEED OF SHIPS.
APPLICATION FILED MAY 14, 1909.
955,008.
Patented Apr. 12, 1910.
5 SHEETS—SHEET 1.
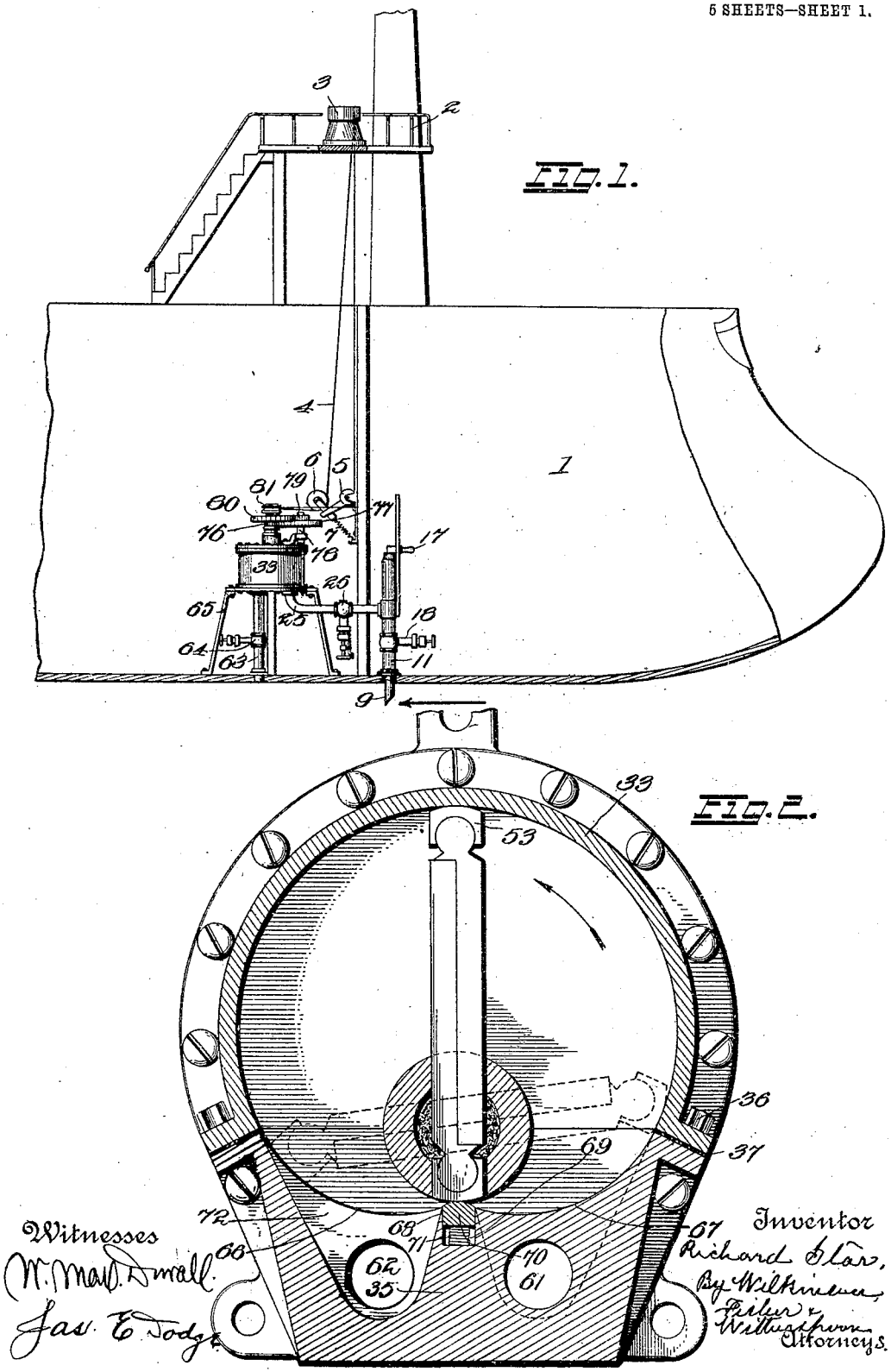

R. STAR.
APPARATUS FOR INDICATING THE SPEED OF SHIPS.
APPLICATION FILED MAY 14, 1909.
955,008.
Patented Apr. 12, 1910.
5 SHEETS—SHEET 2.
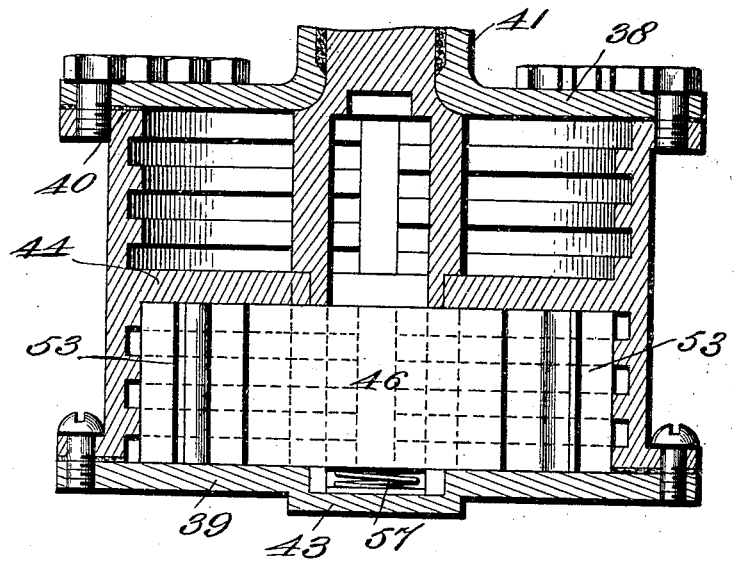
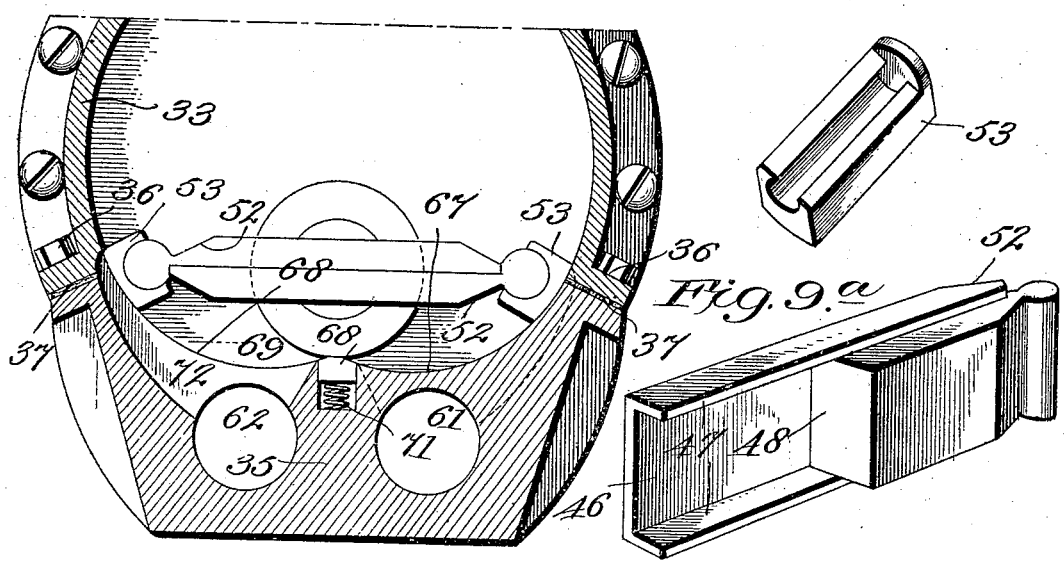

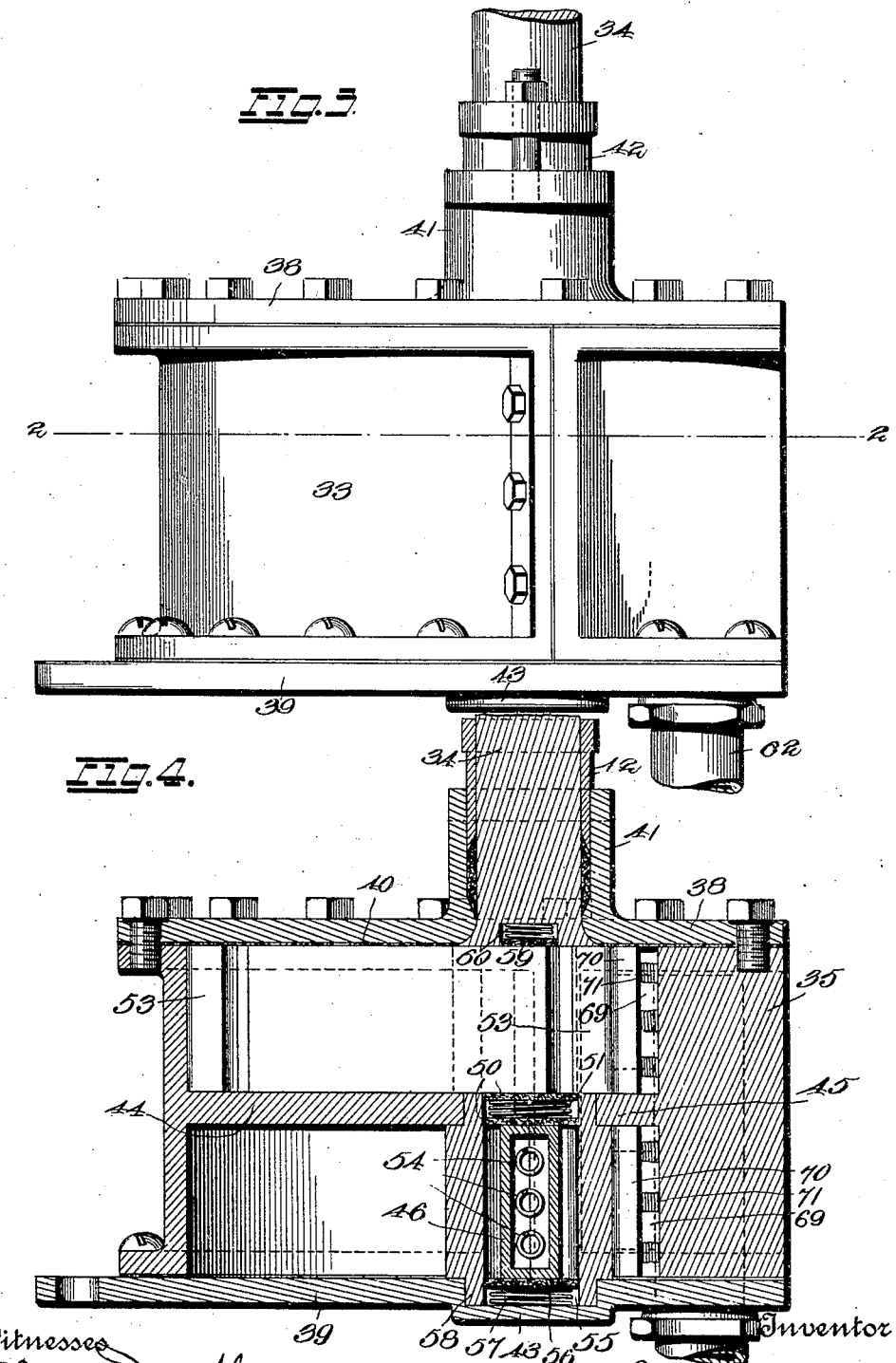

R. STAR.
APPARATUS FOR INDICATING THE SPEED OF SHIPS.
APPLICATION FILED MAY 14, 1909.
955,008.
Patented Apr. 12, 1910.
5 SHEETS—SHEET 4.
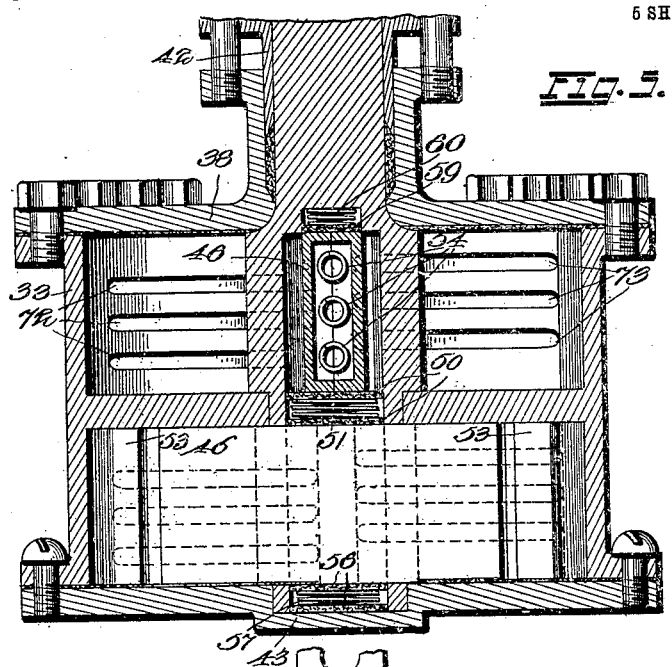
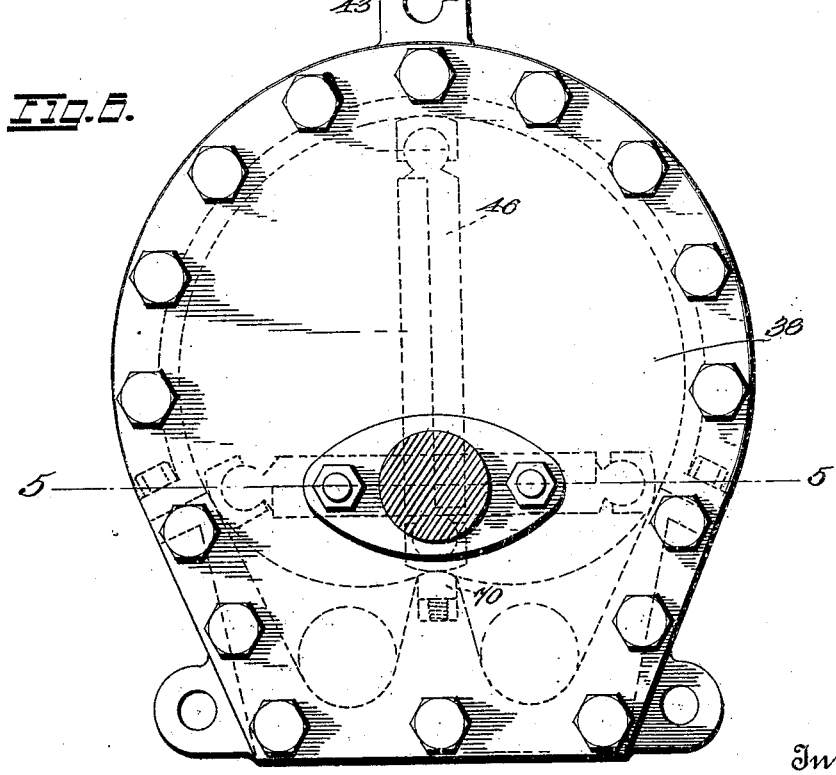
Witnesses
Inventor
Richard Star,
By Wilkinson, Fisher & Witherspoon
Attorneys.

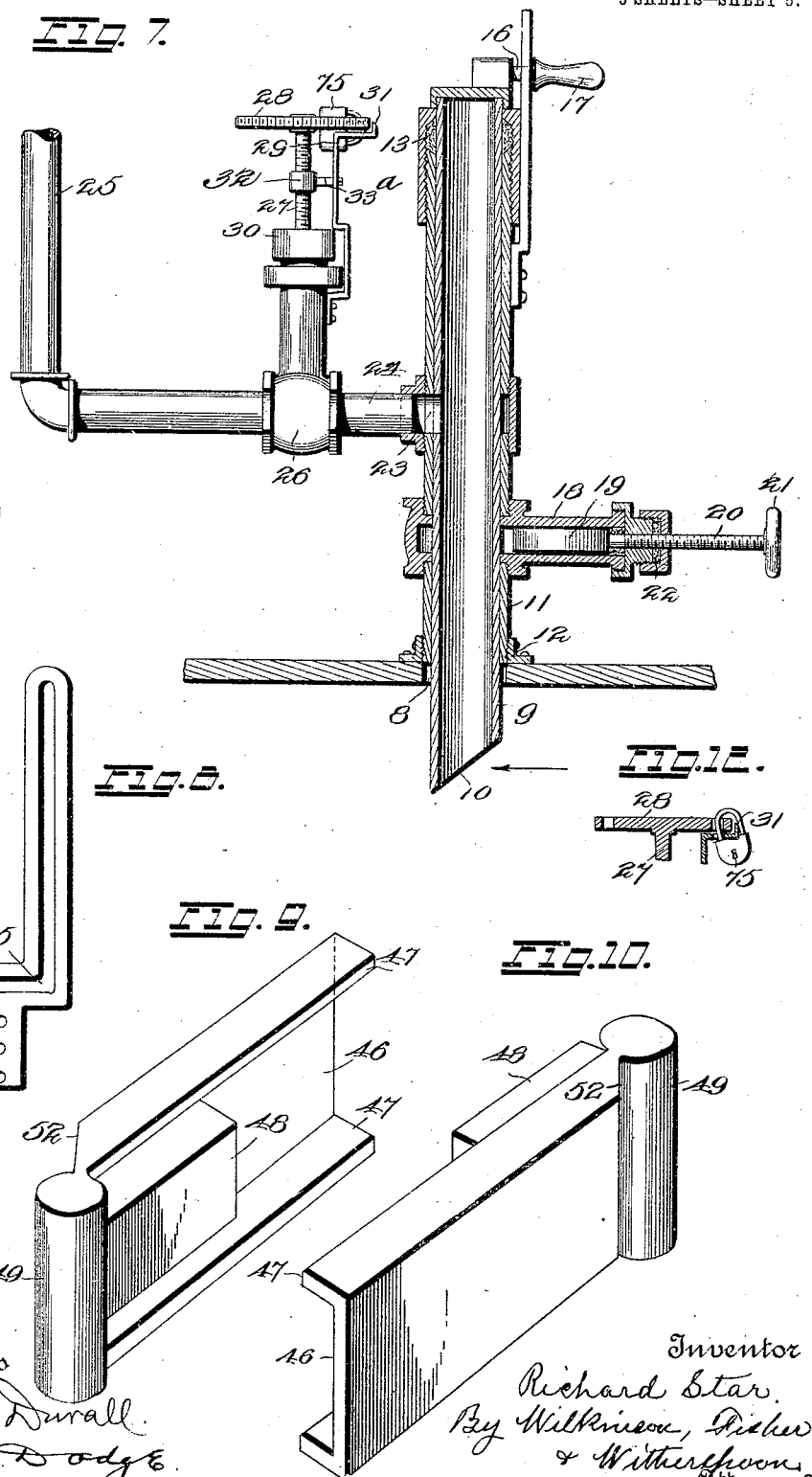

UNITED STATES PATENT OFFICE.

RICHARD STAR, OF NEW YORK, N. Y.

APPARATUS FOR INDICATING THE SPEED OF SHIPS.

955,008.  Specification of Letters Patent.  Patented Apr. 12, 1910.

Application filed May 14, 1909. Serial No. 496,022.

*To all whom it may concern:*

Be it known that I, RICHARD STAR, a citizen of the United States, residing at New York, in the county of New York and State of New York, have invented certain new and useful Improvements in Apparatus for Indicating the Speed of Ships; and I do hereby declare the following to be a full, clear, and exact description of the invention, such as will enable others skilled in the art to which it appertains to make and use the same.

My invention relates to improvements in apparatus for indicating the speed of ships, and the object of my invention is to furnish to the navigator or other officer on the bridge a visual indication at any time of the speed of ships, the apparatus being so arranged that it can be thrown into and out of use at any moment.

With this object in view, my invention consists in the construction and combinations of parts as hereinafter described and claimed.

In the accompanying drawings—Figure 1 represents a diagrammatic view, partly in section, of the bow of a ship, showing my apparatus in position. Fig. 2 is a horizontal section of the motor, taken on the line 2—2, of Fig. 3. Fig. 2ª is a horizontal cross section through a part of the motor casing, showing the parts in the position when the ports are closed. Fig. 3 is a side elevation of the motor casing and connected parts. Fig. 4 is a longitudinal vertical section of the motor. Fig 5 is a cross vertical section of the motor, taken on the line 5—5 of Fig. 6. Fig. 5ª is a vertical cross section through the motor casing, the upper piston being removed. Fig. 6 is a top plan view of the motor casing, with the driving shaft in section. Fig. 7 is a side view, partly in section, showing the intake tube and valves. Fig. 8 is a view of the guide for the lever operating the intake tube. Figs. 9, 9ª and 10 are perspective views of the halves of the double piston. Fig. 11 is a detail view, showing the scale for one of the valve operating rods, and Fig. 12 is a cross section of the top of the same, showing the means for locking the rod. Fig. 13 is a view of one of the end pieces detached.

1 represents a part of a ship, and 2 the bridge thereof, on which is mounted a stand 3, which carries the registering apparatus of any suitable or desired type, which is operated by means of a belt or cord or wire 4, passing over a fixed pulley 5 and a sliding pulley 6, whose position is governed by the spring 7. The belt 4 also passes around a pulley mounted on the shaft of the motor.

The bottom of the ship is provided with a circular perforation, as shown at 8, through which the intake tube 9 is adapted to be moved. This tube is beveled rearwardly, as shown at 10, so as to offer a resistance to the water as the ship moves therethrough, causing the water to rise in the tube 9.

Fitting within the orifice 8 is a tube 11, closely surrounding the tube 9, within which the latter is adapted to slide, which tube is secured by right angle brackets 12 to the ship's bottom, these brackets being bolted or riveted, or secured in any desired manner to the ship's bottom, and to the tube 11. The top of the box is provided with an ordinary stuffing box 13 to prevent the water from leaking around the tube 9 into the ship. To the shell which forms the outer part of the stuffing box is bolted a guide 14, having a right angled slot 15, and in this slot a rod 16 is adapted to slide, which is provided with an operating handle 17, and which engages with a projection on the top of the tube 9. When the tube 9 is out of use, the rod 16 is lifted until it reaches the top of the slot 15, but when it is desired to use the same, the handle is pushed down, pushing the tube 9 into the position shown, in a somewhat exaggerated manner in Fig. 7, the handle 17 being then turned, so that the rod 16 engages in the horizontal portion of the slot 15, thus holding the tube 9 in the position shown in Fig. 7.

Attached to the tube 11, near its bottom, is a valve casing 18, within which is located a gate valve 19, operated by a screw rod 20, having a hand wheel 21, which works through the stuffing box 22. In fact, all the parts of this apparatus may be packed wherever it is desired to prevent leakage. When the device is not in use, the tube 9 is lifted, so that its lower end is above the valve 19, which latter is then closed. This valve 19 then serves the double purpose of supporting the tube 9 and preventing the entrance of water into the apparatus.

The tubes 11 and 9 are perforated, as shown at 23, these perforations registering with each other when the tube 9 is in the position for operating the motor, as shown in Fig. 7. A pipe 24 is connected to the pipe 11, opposite the perforation 23, and this pipe in turn is connected to a pipe 25, which leads to the motor. 26 represents a valve casing, in which is mounted a gate valve, or other suitable form of valve, which is operated by means of the screw-threaded rod 27. On the end of this rod 27 is provided an operating wheel 28, of considerable diameter, having its circumference graduated, as shown in Fig. 7. 29 represents an arm fastened to the upper part of the pipe, above the valve casing 26, the upper part of which is bent twice to form the two right angles, and terminates in a pointer 31, opposite the graduated head of the wheel 28. The vertical portion of this arm is also provided with a vertical slot 74, (see Fig. 11), and the face thereof is graduated. On the rod 27 is fixed a sleeve 32, provided with a pointer 33$^a$, which projects outwardly through the slot in the part 29. By this means, the position of the valve in the casing 26 may be regulated to a nicety. The hand-wheel 28 may be located above the pipe 24, as shown in Fig. 7, or below it, as shown in Fig. 1. The hand-wheel 28 and the arm carrying the pointer are perforated, so that they may be locked together by any suitable means, as by a padlock 75, (see Fig. 12).

The construction of the motor is shown in Figs. 2 to 6, inclusive. It consists of a casing 33, in which is eccentrically mounted the operating shaft 34, which carries on its upper end the pulley 81, loosely mounted thereon, which drives the belt 4. As shown in Figs. 2 and 3, this casing is composed of two parts, one part, 33, of which is of uniform thickness and subtends a circular arc of about 210°, as shown in Fig. 2. The other part, 35, of the casing is much thicker, and is secured to the part 33 by bolts 36, suitable packing 37 being used between them.

38 represents the upper head, and 39 the lower head firmly bolted to both of the parts 33 and 35, a packing, such as 40, being used to prevent leakage. The upper head 38 is provided with a cylindrical extension 41, having a stuffing box 42, through which passes the shaft 34$^a$, and the lower head is provided with a recessed extension 43, within which the lower end of the shaft 34$^a$ engages, as indicated in Fig. 4.

The interior of the motor casing is divided into two substantially equal parts, the part 33 being provided with an extension 44, and the part 35 being provided with an extension 45 in the same plane. These extensions abut against each other, except that in one part they are cut away to leave a circular opening through which passes the shaft 34$^a$.

The shaft 34$^a$ is provided with a long slot in each of these chambers, as best shown in the lower part of Fig. 4, and in each of these slots is mounted a sliding piston, the pistons, however, in the two cylinders being at right angles to each other, as shown in Fig. 4. These pistons are made of two similarly shaped, but oppositely placed, halves, as indicated in Figs. 9 and 10, each half consisting of a back plate 46, having raised edges 47, a centrally-projecting extension 48, and at the end a rounded projection 49. The outer end of the part 46 is beveled as shown at 52.

On each end of each half of the piston is mounted a strip 53, having ears embracing the part 49, over which it is slipped endwise, forming a hinge. The outside of the part 49 and the inside of the part 53 are rounded, as shown in Fig. 2, so that the strip may easily move around and contact with the interior part of the motor chamber. For example, Fig. 2 shows in full lines and in dotted lines one of said pistons in two different positions assumed by it during rotation. The outer part of the strips 53 is also rounded, so that they may revolve around the interior of the casing, making a tight joint with very little friction.

The halves of each piston are normally disposed to fit tightly against each other, as indicated in Fig. 2, but in case any wear should take place, it is my intention that the halves should be gradually forced apart, so that the strips 53 will always contact with the motor casing, and for this purpose I provide a series of spiral springs 54 between the two halves of the piston, (see Fig. 4), to press the halves of said piston away from each other. The bottom of the shaft 34 is hollowed out, as shown in Fig. 4, and cut away, as shown at 55, a packing 56 being provided, which is pressed by the spring 57 firmly against the bottom of the lower piston. The shaft 34$^a$, where it passes through the motor casing, is enlarged, as shown in Fig. 4, and the lower end of this enlarged portion is cut away, forming a cylindrical projection 58, which fits into the cut away portion of the extension 43 of the head 39, the lower part of this circular extension 58 supporting the lower piston.

Water is prevented from leaking around the upper piston by means of a packing disk 59, which is pressed down by a spring 60 against the top of the upper piston. 50 represents packing disks which are pressed apart by the spring 51, and which prevent water from leaking from one chamber into the other. The part 35 is provided with an inlet port 61 and an outlet port 62. To the inlet port, the pipe 25 is connected, and to the outlet port a waste pipe 63 is connected, provided with a suitable valve located in the casing 64. The motor casing is supported on the ship's bottom by brackets or legs 65, or in any suitable manner.

Referring especially to Figs. 2, 4 and 5, it will be seen that the part 35 is much thicker than the part 33 to provide an opportunity for connecting the inlet and discharge pipes thereto, and also for efficiently separating the inlet and exhaust portions of the motor chambers. As shown in Fig. 2, the interior of the part 35 is provided with two curved portions 66 and 67, which are not curves of the same radius as the part 33, and present a sharper curve, terminating in a central upraised portion 68. This extension 68 is cut away, as shown at 69, and in the cut away portion is mounted a bar 70, having three straight sides, but having its interior rounded, against which rounded surface the strips 53 are adapted to strike. The interior of the part 35 may present a greater radius than that of the part 33, but in any case it should always have a different radius from that of the part 33. Springs 71 normally press the bar 70 toward the center of the motor. The part 35 is also provided with a series of deep grooves 72 and 73, these grooves extending outwardly over the inlet and discharge pipes, respectively, and said grooves being arranged staggered with respect to each other, as indicated in Fig. 5, so that there will be no possible chance for the water to leak past the bar 70.

In practice, I find it desirable to transmit the motion of the shaft $34^a$ to the indicating apparatus by means of a slow-down gearing, such as shown in Fig. 1, as, under ordinary conditions, the shaft $34^a$ revolves more rapidly than it is desired to revolve the parts of the indicator. I therefore mount on the shaft $34^a$ a fixed gear wheel 76, which meshes with a loose gear wheel 77, carried on a stub shaft 78, mounted on the top of the motor casing, and which gear wheel 77 has attached to it a smaller gear wheel 79, which gears with a larger gear wheel 80, loosely mounted on the shaft $34^a$, but connected with the pulley 81, over which the belt 4 runs.

The operation is as follows:—When the apparatus is to be thrown out of use, the tube 9 is pulled up, with its lower end above the valve 19, and the latter valve is then closed. This supports the tube 9 and prevents water from entering therein, thus shutting off the operation of the motor. The wheel 28 is always locked, except when adjusting the motor.

When it is desired to use the apparatus, the valve in the pipe 63 is opened, the valve 19 is opened, and the tube 9 forced down into the position shown in Fig. 7, as already described. The position of the valve in the casing 26 has already been accurately adjusted by means of the screw rod 27 and the wheel 28. Owing to the shape of the lower end of the tube 9, water is forced upwardly through said tube, passing through the pipe 25 into the inlet opening 61, which communicates with both chambers in the motor casing. As the pistons in said chambers are arranged at right angles to each other, as shown in Fig. 5, the motor will always start promptly, no matter what the position of the pistons may be. Owing to the fact that the shaft $34^a$ is mounted eccentrically in the motor casing, the water entering the apparatus forces the pistons around in the direction of the curved arrow shown in Fig. 2. When either one of the pistons has reached a position, as indicated in dotted lines in Fig. 2, the water commences to leak past the strip 53, and passes out through the groove 72 into the outlet port 62, and is thence delivered by the pipe 63 out through the bottom of the ship. Meantime, the operation of the pistons drives the shaft 34, and which, by means of the slow-down gearing already described, drives the belt 4, which, in turn, operates the indicating device mounted upon the bridge. The officer at the bridge, therefore, by observing this indicator, can tell at once the speed of the ship, the parts having, of course, been previously tested on a measured course.

While I have thus described my invention, I do not limit myself to the exact details shown and described, as obviously these could be varied considerably without departing from the spirit of my invention.

I claim—

1. In an apparatus for indicating the speed of ships, the combination of a motor, inlet and outlet pipes connected to said motor and passing through the ship's bottom, both of said pipes being provided with suitable valves, a pipe slidably mounted in said inlet pipe, a valve normally supporting said pipe within the ship when the apparatus is not in use, and means for lowering said movable pipe with its end below the ship's bottom and for locking the same in this position when the supporting valve is open, substantially as described.

2. In an apparatus for indicating the speed of ships, the combination of a motor, inlet and outlet pipes connected to said motor and passing through the ship's bottom, both of said pipes being provided with suitable valves, a pipe slidably mounted in said inlet pipe, a valve normally supporting said pipe within the ship when the apparatus is not in use, means for lowering said movable pipe with its end below the ship's bottom and for locking the same in this position when the supporting valve is open, substantially as described.

3. In an apparatus for indicating the speed of ships, the combination of a motor, an indicating device mounted on the bridge, connections between said motor and said indicating device, inlet and outlet pipes connected with said motor, each of said pipes being provided with a suitable valve, graduated means for adjusting the position of the valve in the inlet pipe, a pipe slidably mounted in said inlet pipe, a valve in said inlet pipe adapted to support the slidable valve when the apparatus is not in use, and means for lowering and locking said movable pipe when said last-named valve is open, substantially as described.

4. In an apparatus for indicating the speed of ships, the combination of an indicator mounted on the bridge, a motor mounted in the ship, and connections including slow-down gearing between said motor and said indicator, valved inlet and outlet pipes connected with said motor, a pipe slidably mounted in said inlet pipe and having its lower end open and beveled, a second valve in said inlet pipe adapted when closed to support said slidably mounted pipe, and means for depressing and locking said slidable pipe with its end below the ship's bottom when said valve is open, substantially as described.

5. In an apparatus for indicating the speed of ships, the combination of an indicator mounted on the bridge, a motor mounted in the ship, connections between said motor and said indicator, inlet and outlet pipes for said motor, a valve in each of said pipes, the valve governing the flow in the inlet pipe, being provided with graduated means for adjusting its position, and with means for locking it, a pipe slidably mounted in said inlet pipe and adapted to have its lower end pushed down through the ship's bottom, a second valve in said inlet pipe adapted when closed to support said slidable pipe inside the ship, and means for depressing and locking said slidable pipe with its lower end below the ship's bottom when said last-named valve is open, substantially as described.

6. In a device for indicating the speed of ships, the combination of an indicator, a motor, inlet and outlet pipes for said motor, a valve in each of said pipes, and means for adjusting the position of the valve in the inlet pipe, consisting of a screw-threaded rod attached to the valve in the inlet pipe, a screw-threaded sleeve carrying a pointer, said sleeve engaging said rod, a slotted graduated arm over which said pointer moves, a hand wheel having a graduated circumference, said wheel being attached to said rod, and a pointer carried by said slotted arm and located near the graduations of said wheel, substantially as described.

7. In a device for indicating the speed of ships, the combination of an indicator, a motor, inlet and outlet pipes for said motor, a valve in each of said pipes, and means for adjusting the position of the valve in the inlet pipe, consisting of a screw-threaded rod attached to the valve in the inlet pipe, a screw-threaded sleeve carrying a pointer, said sleeve engaging said rod, a slotted graduated arm over which said pointer moves, a hand-wheel having a graduated circumference, said wheel being attached to said rod, a pointer carried by said slotted arm and located near the graduations of said wheel, and means for locking said wheel and said arm together, substantially as described.

8. In an apparatus for indicating the speed of ships, the combination of a motor, valved inlet and outlet pipes for said motor, a second valve in said inlet pipe, a pipe slidably mounted in said inlet pipe and having its lower end open and beveled, said pipe being adapted to rest upon said second named valve when the apparatus is not in use, an arm provided with a right angled slot, said arm being connected to the top of said inlet pipe, and a handle connected to said slidable pipe and having a reduced portion engaging said slot, whereby said slidable pipe may be pushed down through an opening in the ship's bottom and locked, substantially as described.

9. In an apparatus for indicating the speed of ships, the combination of a motor, devices whereby water is caused to flow through said motor as the ship moves, an indicator, and connections between said motor and said indicator, including a cord, a guide pulley for said cord, and a spring-pulled sliding pulley engaging said cord, substantially as described.

In testimony whereof, I affix my signature, in presence of two witnesses.

RICHARD STAR.

Witnesses:
  H. T. McKeever,
  Geo. B. Pitts.